United States Patent Office 3,849,399
Patented Nov. 19, 1974

3,849,399
2-SUBSTITUTED-3H-1,4-BENZODIAZEPINES
David Coffen, Glenridge, and Rodney Fryer, North Caldwell, N.J., assignors to Hoffmann-La Roche Inc., Nutley, N.J.
No Drawing. Filed July 23, 1973, Ser. No. 383,364
Int. Cl. C07d 53/06
U.S. Cl. 260—239 BD                          4 Claims

ABSTRACT OF THE DISCLOSURE

Novel 3H-1,4-benzodiazepine derivatives bearing a cyano or carboxamido substituent in the 2-position are disclosed. These 2-substituted-3H-1,4-benzodiazepines are useful as muscle-relaxant, anti-convulsant and sedative agents.

DETAILED DESCRPTION OF THE INVENTION

The present invention relates to 2-substituted-1,4-benzodiazepines. More particularly, this invention covers 3H-1,4-benzodiazepines substituted in the 2-position with a cyano or carboxamido group. This invention further comprehends processes for making these novel benzodiazepines and novel intermediates used in these processes.

More specifically, the compounds of the present invention are selected from the group consisting of compounds of the formula

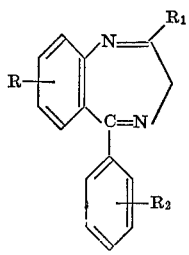

I wherein R is selected from the group consisting of hydrogen, halogen, lower alkyl, trifluoromethyl, nitro, cyano, lower alkoxy and lower alkylthio;
$R_1$ signifies cyano or carboxamido;
$R_2$ signifies hydrogen or halogen and the pharmaceutically acceptable acid addition salts thereof.

As used herein, the term "lower alkyl" either alone or in combination refers to straight and branched chain hydrocarbon groups containing from 1 to 7, preferably from 1 to 4, carbon atoms, such as, for example, methyl, ethyl, propyl, isopropyl, isobutyl, butyl and the like. The term "halogen" refers to all four forms thereof, i.e. bromine, chlorine, fluorine and iodine. The term "lower alkoxy" designates straight or branched chain saturated hydrocarbonoxy groups containing from 1 to 7 carbon atoms, preferably from 1 to 4 carbon atoms, such as methoxy, ethoxy, propoxy and the like.

A preferred class of compounds falling within the scope of formula I above are those wherein R signifies hydrogen, halogen or nitro and is located at the 7-position of the benzodiazepine moiety, and $R_2$ is hydrogen or halogen and is located at the ortho-position of the 5-phenyl ring, i.e. compounds of the formula

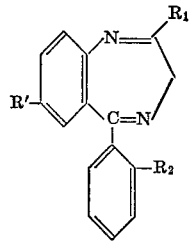

Ia wherein $R_1$ signifies hydrogen, halogen or nitro; $R_1$ and $R_2$ are as described above and the pharmaceutically acceptable acid addition salts thereof.

When the R substituent is a halogen group, it is preferably a chlorine group while when the $R_2$ substituent is a halogen group, it is preferably chlorine or fluorine.

Another preferred class of compounds falling within the scope of formula I above are those wherein $R_1$ signifies cyano, i.e. compounds of the formula

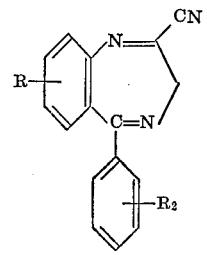

Ib wherein R and $R_2$ are as described above.

A further preferred class of compounds within the scope of formula I above are those wherein $R_1$ signifies carboxamido, i.e. compounds of the formula

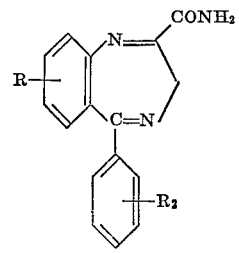

Ic wherein R and $R_2$ are as described above.

The most preferred of the compounds of formula I above are:

2-cyano-7-chloro-5-phenyl-3H-1,4-benzodiazepine;
2-carboxamido-7-chloro-5-phenyl-3H - 1,4 - benzodiazepine; and
2-carboxamido - 7 - chloro-5-(2-fluorophenyl)-3H-1,4-benzodiazepine.

The compounds of formula I above are prepared as described below. Thus, the compounds of formula I wherein $R_1$ signifies cyano, i.e. the compounds of formula Ib above, are prepared via the oxidation of the corresponding 2-cyano-2,3-dihydro-1H-1,4 - benzodiazepine of the formula

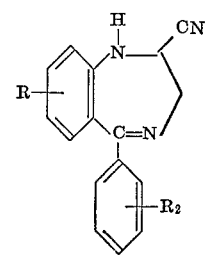

II wherein R and $R_2$ are as described above.

Suitable oxidizing agents for the purpose of converting the compound of formula II to the desired compound of formula Ib include manganese dioxide, N-bromosuccinimide (NBS), quinone, chloranil and dichloro-dicyanoquinone (DDQ), with manganese dioxide being the preferred oxidizing agent. This oxidation reaction is expediently effected in the presence of an inert, non-nucleophilic organic solvent. Representative of such solvents are aromatic hydrocarbons such as benzene, toluene and xylene; ethers such as tetrahydrofuran; dioxane; dimethoxyethane, and the like. This reaction is effected at temperatures above room temperature, preferably at the reflux temperature of the reaction mixture.

The starting materials of formula II above are prepared via the cyanation of the corresponding 3H-1,4-benzodiazepine of the formula

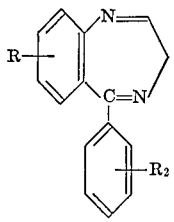

wherein R and $R_2$ are as described above.

The conversion of the compound of formula III to the 2-cyano derivative of formula II may be accomplished by treating said compound with an aqueous mixture of an alkali metal cyanide, preferably potassium cyanide, and glacial acetic acid in a suitable solvent such as methanol. The cyanide/glacial acetic acid mixture generates HCN, which acts as the cyanating agent. Thus, this conversion could alternatively be accomplished by adding HCN to a solution of the compound of formula III.

The compounds of formula III above used as the starting materials in the preparation of the formula II compounds are known or can be prepared in analogy to the preparation of the known compounds.

In a further process aspect, the compounds of formula II above are used as the starting materials in the preparation of the compounds of formula I wherein $R_1$ signifies a carboxamido group, i.e. the compounds of formula Ic. Conversion of the cyano group in the 2-position of the compounds of formula II to a carboxamido group is accomplished by treating the formula II compound with an aqueous mineral acid. Suitable acids for this purpose include hydrohalic acids such as hydrobromic acid and hydrochloric acid, aqueous sulfuric acid, phosphoric acid, perchloric acid and the like. This reaction is expediently effected employing temperatures in the range of from room temperature to about 100° C., with temperatures in the range of between 40° and 60° C. being preferred. Treatment of the 2-cyano compound of formula II with an aqueous mineral acid results in the preparation of the corresponding 2,3-dihydro-2-carboxamido-benzodiazepine of the formula:

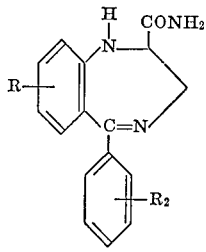

wherein R and $R_2$ are as described above.

The compounds of formula IV above are in themselves novel and as such form a part of the present invention. These compounds are not only useful as intermediates in the preparation of the compounds of formula Ic above, but are also active per se as muscle-relaxant, anti-convulsant and sedative agents.

The so-obtained compound of formula IV above is then oxidized to yield the desired compound of formula Ic. This oxidation is accomplished employing the same reaction conditions as those described above in the oxidation of the compound of formula II to the corresponding compound of formula Ib.

The compounds of formulae I and IV above form pharmaceutically acceptable acid addition salts with inorganic and organic acids. Thus the compounds of the present invention form pharmaceutically acceptable acid addition salts with inorganic acids such as the hydrohalic acids, for example hydrochloric acid and hydrobromic acid, and with organic acids such as tartaric acid, citric acid, camphor sulfonic acid, ethane sulfonic acid, toluene sulfonic acid, salicylic acid, ascorbic acid, maleic acid, succinic acid, formic acid, acetic acid and the like.

The compounds of formulae I and IV above as well as their pharmaceutically acceptable acid addition salts are useful as anti-convulsants, muscle relaxants and sedatives. Thus these compounds and their pharmaceutically acceptable salts can be used as medicaments. For example, they can be used in the form of pharmaceutical preparations which contain them or their salts in admixture with a pharmaceutical organic or inorganic carrier material which is suitable for enteral or parenteral application, such as, for example, water, gelatin, lactose, starches, magnesium sterate, talc, vegetable oils, gum arabic, polyalkylene glycols, vaseline etc. The pharmaceutical preparations can be prepared in solid form (e.g. as tablets, dragées, suppositories, capsules) or in liquid form (e.g. as solutions, suspensions or emulsions). They may be sterilized and/or contain additives such as preserving, stabilizing, wetting or emulsifying agents, salts for varying the osmotic pressure or buffers. They can also contain other therapeutically valuable substances.

The compounds of formulae I and IV above or their pharmaceutically acceptable salts can be administered at dosages adjusted to individual requirements and fitted to the pharmaceutical exigencies of the situation. Convenient pharmaceutical dosages are in the range of from about 2 mg. to about 200 mg. per day.

The useful anticonvulsant activity of the compounds of this invention is shown in warm blooded animals utilizing the standard antimetrazole test. This test was carried out according to the method of Everett and Richard (J.P.E.T., 81: 402, 1944). The $ED_{50}$ was calculated as the dose which would prevent convulsions in 50% of the mice tested after administration of 125 mg./kg. of pentylenetetrazole by the subcutaneous route. Following these test procedures compounds such as: 2-carboxamido-7-chloro-2,3-dihydro-5-phenyl - 1H - 1,4 - benzodiazepine (Compound A), 2-carboxamido-7-chloro-5-phenyl-3H-1,4-benzodiazepine (Compound B) and 2-cyano-7-chloro-5-phenyl-3H-1,4-benzodiazepine (Compound C) show an $ED_{50}$ of 4.6±0.6, 1.72±0.38, and 2.55±0.3 respectively, indicating that these compounds exhibit anticonvulsant activity.

The sedative and muscle relaxant activity of the compounds of the invention are shown using the standard foot shock test. In this test a pair of mice is confined under a 1-liter beaker placed on a grid which presents shock to the feet. At least five fighting episodes are elicited in a 2-minute period. Pairs of mice are marked and pretreated one hour prior to a second shock. Logarithmic dose intervals are utilized up to a maximum of 10 mg./kg. At the 100% blocking dose 3 out of 3 pairs must be blocked from fighting. The measurements are made at the dose level at which 100% blocking is observed and the results are expressed as the dose in mg./kg. which blocks the fighting response for 1-hour. Following these test procedures, Compound A exhibited a $PD_{50}$ of 10 mg./kg., Compound B exhibited a $PD_{50}$ of 3.45 mg./kg. and Compound C exhibited a $PD_{50}$ of 40 mg./kg., indicating that these compounds exhibit sedative and muscle relaxant activity.

The following examples are illustrative of the present invention. All temperatures are given in degrees centigrade.

EXAMPLE 1

Preparation of 7-chloro-2-cyano-2,3-dihydro-5-(2-fluorophenyl)-1H-1,4-benzodiazepine A mixture of manganese dioxide (General Metallic Oxides, Type #37) (50 g.) in benzene (500 ml.) was heated and stirred under reflux while collecting water in a Dean-Stark trap. After 1 hr., 7-chloro-2,3-dihydro-5-(2-fluorophenyl)-1H-1,4-benzodiazepine (5 g.) and acetic acid (17 ml.) were added and stirring under reflux was continued for an additional hour. TLC analysis of the reaction mixture at this point established that the oxidation was complete. The manganese dioxide was filtered out and washed with a 1:1 mixture of ethanol and methylene chloride. The combined filtrate and washings was washed with aqueous sodium carbonate solution and with water, dried and evaporated to leave an oily residue.

The crude manganese dioxide oxidation product from 30 g. of 7-chloro-2,3-dihydro-5-(2-fluorophenyl)-1H-1,4-benzodiazepine prepared as described above, was taken up in tetrahydrofuran (100 ml.) and treated with a solution of potassium cyanide (19 g.) in water (40 ml.). A solution of acetic acid (22 ml.) in methanol (66 ml.) was added to the resulting mixture during the course of 5 minutes. This solution was then stripped of solvent under reduced pressure and the residue partitioned between methylene chloride and water. The methylene chloride layer was extracted with 10% hydrochloric acid and discarded. The acid extract was made basic with aqueous potassium hydroxide and extracted with methylene chloride. The residue from this extract after drying and evaporation was crystallized from methylene chloride/cyclohexane to give the above-named product as pale yellow crystals, m.p. 163–164°.

EXAMPLE 2

Preparation of 2-Carboxamido-7-chloro-1,3-dihydro-5-(2-fluorophenyl)-2H-1,4-benzodiazepine A solution of 7-chloro-2-cyano-2,3-dihydro-5-(2-fluorophenyl)-1H-1,4-benzodiazepine (6.0 g.) in concentrated hydrochloric acid (40 ml.) was placed in a 60° water bath and kept for 1 hr. during which the bath cooled to about 40°. The solution was poured into excess aqueous sodium carbonate solution and the product extracted with methylene chloride. After drying and evaporation, the residue was crystallized from methylene chloride/petroleum ether to give the above-named product as very pale yellow crystals, m.p. 192–193°.

EXAMPLE 3

Preparation of 2-Carboxamido - 7 - chloro-5-(2-fluorophenyl)-3H-1,4-benzodiazepine Manganese dioxide (32 g.) in benzene (1 l.) was stirred under reflux while collecting water in a Dean-Stark trap for 1 hr. Acetic acid (15 ml.) and 2-carboxamido - 7-chloro-1,3-dihydro-5-(2-fluorophenyl) - 2H - 1,4 - benzodiazepine (3.2 g.) were added and stirring at reflux continued for 2 hours. The manganese dioxide was filtered out and washed with hot benzene. The filtrate and washings were then washed with water and with aqueous sodium carbonate solution, dried and evaporated. The oily residue crystallized from methylene chloride/petroleum ether to yield the above-named product as colorless crystals, m.p. 178–180°.

EXAMPLE 4

Preparation of 7 - chloro - 2 - cyano-2,3-dihydro-5-phenyl-1H-1,4-benzodiazepine A stirred solution of crude 7-chloro-5-phenyl-3H-1,4-benzodiazepine obtained from the oxidation of 7-chloro-2,3-dihydro-5-phenyl-1H-1,4 - benzodiazepine (128 g.) with manganese dioxide in THF (500 ml.) was cooled in a water bath with simultaneous addition of the following solutions: (a) potassium cyanide (88 g.) in water (180 ml.) and (b) glacial acetic acid (100 ml.) in methanol (300 ml.). The resulting mixture was stirred for 30 minutes after completion of the additions and then concentrated to about 400 ml. under reduced pressure during which the product began to separate. Crystallization of the crude product was completed by dilution with 2 l. of water and chilling. The solid was collected and recrystallized from methylene chloride/cyclohexane mixture to give the above-named product as pale yellow crystals, m.p. 181–183° (dec.).

EXAMPLE 5

Preparation of 7-chloro - 2-cyano-5-phenyl-3H-1,4-benzodiazepine

Manganese dioxide (25 g.) slurried in benzene (250 ml.) was stirred and heated under reflux for 1 hr. while collecting water in a Dean-Stark trap. 7-Chloro-2-cyano-2,3-dihydro-5-phenyl-1H-1,4 - benzodiazepine (5 g.) was added and stirring with reflux continued for 16 hours. The solid was filtered and washed with methylene chloride. The filtrate and washings were evaporated to a yellow oil which was taken up in ether giving the above-named product as pale yellow crystals, m.p. 151–154°.

EXAMPLE 6

Preparation of 2-carboxamido - 7 - chloro-2,3-dihydro-5-phenyl-1H-1,4-benzodiazepine 7-Chloro - 2 - cyano - 2,3 - dihydro-5-phenyl-1H-1,4-benzodiazepine (10 g.) was dissolved in concentrated hydrochloric acid (40 ml.) and warmed in a 40° water bath for 45 min. The resulting solution was poured over ice, made basic with aqueous sodium carbonate and extracted with methylene chloride. After drying and evaporation, the residue was recrystallized from methylene chloride/ether to give the above-named product in four crops. Pure crystals of the product are colorless with m.p. 210–213°.

EXAMPLE 7

Preparation of 2-carboxamido - 7 - chloro - 5 - phenyl-3H-1,4-benzodiazepine

A slurry of manganese dioxide (50 g.) in benzene (250 ml.) containing acetic acid (0.2 ml.) was heated under reflux for 2 hrs. while collecting water in a Dean-Stark trap. 2 - Carboxamido - 7 - chloro-2,3-dihydro-5-phenyl-1H-1,4-benzodiazepine (5 g.) was added and stirring at reflux continued for 17 hours. The mixture was cooled, filtered with washing of solid, and evaporated to give a tan solid. Recrystallization from chloroform/ether gave the above-named product as colorless needles, m.p. 219–221° (dec.).

EXAMPLE 8

| Capsule Formulation: | Per Capsule (mg.) |
|---|---|
| 2-Carboxamido-7-chloro - 5 - phenyl-3H-1,4-benzodiazepine | 50 |
| Lactose, USP | 125 |
| Corn Starch, USP | 30 |
| Talc, USP | 5 |
| Total Weight | 210 |

Procedure

1. The drug was mixed with lactose and corn starch in a suitable mixer.
2. The mixture was further blended by passing through a Fitzpatrick Comminuting machine with a #1A screen with knives forward.
3. The blended powder was returned to the mixer, the talc added and blended thoroughly.
4. The mixture was filled into #4 hard shell gelatin capsule on a Parke Davis capsulating machine.

EXAMPLE 9

| Capsule Formulation: | Per Capsule (mg.) |
|---|---|
| 2-Carboxamido - 7 - chloro - 5-phenyl-3H-1,4-benzodiazepine | 10 |
| Lactose | 158 |
| Corn Starch | 37 |
| Talc | 5 |
| Total Weight | 210 |

7

Procedure

1. The drug was mixed with the lactose and corn starch in a suitable mixer.
2. The mixture was further blended by passing a Fitzpatrick Comminuting machine with a #1A screen with knives forward.
3. The blended powder was returned to the mixer, the talc added and blended thoroughly. The mixture was then filled into #4 hard shell gelatin capsules on a Parke Davis capsulating machine. (Any similar type machine may be used.)

EXAMPLE 10

Tablet Formulation:                              Per Tablet (mg.)

| | |
|---|---|
| 2 - Carboxamido - 7 - chloro-5-phenyl-3H-1,4-benzodiazepine | 25.00 |
| Lactose, USP | 64.50 |
| Corn Starch | 10.00 |
| Magnesium Stearate | 0.50 |
| Total Weight | 100.00 |

Procedure

1. The drug was mixed with the lactose, corn starch and magnesium stearate in a suitable mixer.
2. The mixture was further blended by passing through a Fitzpatrick Comminuting machine fitted with a #1A screen with knives forward.
3. The mixed powders were slugged on a tablet compressing machine.
4. The slugs were comminuted to a mesh size (#16 screen) and mixed well.
5. The tablets were compressed at a tablet weight of 100 mg. using tablet punches having a diameter of approximately ¼". (Tablets may be either flat or biconvex and may be scored if desired.)

EXAMPLE 11

Tablet Formulation:                              Per Tablet (mg.)

| | |
|---|---|
| 2 - Carboxamido - 7 - chloro-5-phenyl-3H-1,4-benzodiazepine | 10.0 |
| Lactose | 113.5 |
| Corn Starch | 70.5 |
| Pregelatinized Corn Starch | 8.0 |
| Calcium Stearate | 3.0 |
| Total Weight | 205.0 |

Procedure

1. The drug was mixed with the lactose, corn starch and pregelatinized corn starch in a suitable size mixer.
2. The mix was passed through a Fitzpatrick Comminuting machine fitted with #1A screen and with knives forward.
3. The mix was returned to the mixer and moistened with water to a thick paste. The moist mass was passed through a #12 screen and the moist granules were dried on paper lined trays at 110° F.
4. The dried granules were returned to the mixer, the calcium stearate was added, and mixed well.
5. The granules were compressed at a tablet weight of 200 mg. using standard concave punches having a diameter of ⁵⁄₁₆".

EXAMPLE 12

The following compounds can also be incorporated as the active ingredient in the formulation set forth in Examples 8–11: 2-carboxamido-7-chloro-2,3-dihydro-5-phenyl-1H-1,4-benzodiazepine; and 7-chloro-2-cyano-5-phenyl-3H-1,4-benzodiazepine.

We claim:

1. A compound of the formula

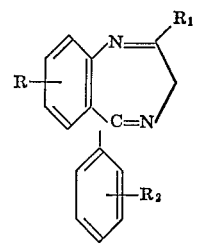

wherein
R is selected from the group consisting of hydrogen, halogen, lower alkyl, trifluoromethyl, nitro, cyano, lower alkoxy and lower alkylthio;
$R_1$ signifies cyano or carboxamido;
$R_2$ signifies hydrogen or halogen
and the pharmaceutically acceptable acid addition salts thereof.

2. The compound of claim 1 of the formula 2-cyano-7-chloro-5-phenyl-3H-1,4-benzodiazepine.

3. The compound of claim 1 of the formula 2-carboxamido-7-chloro-5-phenyl-3H-1,4-benzodiazepine.

4. The compound of claim 1 of the formula 2-carboxamido - 7 - chloro - 5 - (2 - fluorophenyl) - 3H-1,4-benzodiazepine.

References Cited

UNITED STATES PATENTS

| | | | |
|---|---|---|---|
| 3,481,921 | 12/1969 | Field et al. | 260—239 BD |
| 3,562,251 | 2/1971 | Fryer et al. | 260—239 BD |
| 3,492,290 | 1/1970 | Field et al. | 260—239 BD |

OTHER REFERENCES

Hickenbottom: Reactions of Organic Compounds (Longmans, Green and Co., London, 1948), p. 249.

ALTON D. ROLLINS, Primary Examiner

U.S. Cl. X.R.

424—244

UNITED STATES PATENT OFFICE
CERTIFICATE OF CORRECTION

PATENT NO. : 3,849,399
DATED : November 19, 1974
INVENTOR(S) : David L. Coffen and Rodney Ian Fryer It is certified that error appears in the above-identified patent and that said Letters Patent are hereby corrected as shown below:

Column 1, line 5, "July 23, 1973"

Should be July 27, 1973

Signed and Sealed this

Tenth Day of August 1976

[SEAL]

Attest:

RUTH C. MASON
Attesting Officer

C. MARSHALL DANN
Commissioner of Patents and Trademarks